United States Patent
Chen et al.

(10) Patent No.: US 10,662,312 B2
(45) Date of Patent: May 26, 2020

(54) FLAME RETARDANT COMPOSITION, METHODS OF MANUFACTURE THEREOF AND ARTICLES COMPRISING THE SAME

(71) Applicant: SABIC GLOBAL TECHNOLOGIES B.V., Bergen op Zoom (NL)

(72) Inventors: Lin Chen, Shanghai (CN); Hongtao Shi, Shanghai (CN); Yun Zheng, Shanghai (CN); Chunjie Zhang, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 220 days.

(21) Appl. No.: 15/570,473

(22) PCT Filed: Apr. 27, 2016

(86) PCT No.: PCT/IB2016/052390
§ 371 (c)(1),
(2) Date: Oct. 30, 2017

(87) PCT Pub. No.: WO2016/174592
PCT Pub. Date: Nov. 3, 2016

(65) Prior Publication Data
US 2018/0142079 A1 May 24, 2018

Related U.S. Application Data

(60) Provisional application No. 62/154,851, filed on Apr. 30, 2015.

(51) Int. Cl.
| | | |
|---|---|---|
| *C08K 5/00* | (2006.01) | |
| *C08K 5/5399* | (2006.01) | |
| *C08L 25/12* | (2006.01) | |
| *C08L 55/02* | (2006.01) | |
| *C08L 67/02* | (2006.01) | |
| *C08L 69/00* | (2006.01) | |
| *C08L 83/10* | (2006.01) | |

(52) U.S. Cl.
CPC .......... *C08K 5/0066* (2013.01); *C08K 5/5399* (2013.01); *C08L 25/12* (2013.01); *C08L 55/02* (2013.01); *C08L 67/02* (2013.01); *C08L 69/00* (2013.01); *C08L 83/10* (2013.01)

(58) Field of Classification Search
None
See application file for complete search history.

(56) References Cited

U.S. PATENT DOCUMENTS

| | | |
|---|---|---|
| 2,465,319 A | 3/1949 | Whinefield et al. |
| 3,047,539 A | 7/1962 | Pengilly |
| 3,953,404 A | 4/1976 | Borman |
| 4,042,561 A | 8/1977 | Deedwardo et al. |
| 5,367,011 A | 11/1994 | Walsh |
| 5,411,999 A | 5/1995 | Gallucci |
| 6,630,524 B1 | 10/2003 | Lim et al. |
| 7,205,346 B2* | 4/2007 | Harashina ................ C08K 3/24 524/133 |
| 2013/0313493 A1* | 11/2013 | Wen .......................... C08K 3/22 252/601 |
| 2013/0317141 A1* | 11/2013 | Cheng ...................... C08K 3/22 524/116 |
| 2013/0317142 A1* | 11/2013 | Chen ........................ C08L 71/12 524/116 |
| 2013/0317143 A1* | 11/2013 | Daga ......................... C08K 3/22 524/116 |
| 2013/0317144 A1* | 11/2013 | Wu ........................... C08K 3/22 524/116 |
| 2013/0317145 A1* | 11/2013 | An ............................ C08K 3/22 524/116 |
| 2013/0317147 A1* | 11/2013 | Li ............................. C08K 3/22 524/116 |
| 2013/0317148 A1* | 11/2013 | Zheng ...................... C08K 3/22 524/116 |
| 2013/0317149 A1* | 11/2013 | Zhao ........................ C08L 67/04 524/127 |
| 2014/0295363 A1 | 10/2014 | Sun et al. |
| 2014/0371360 A1* | 12/2014 | Zheng ...................... C08L 69/00 524/116 |

(Continued)

FOREIGN PATENT DOCUMENTS

| | | |
|---|---|---|
| WO | 9003417 A1 | 4/1990 |
| WO | 2014072923 A1 | 5/2014 |
| WO | 2014086800 A1 | 6/2014 |

OTHER PUBLICATIONS

International Search Report for International Application No. PCT/IB2016/052390, International Filing Date Apr. 27, 2016, dated Jul. 12, 2016, 5 pages.

(Continued)

*Primary Examiner* — Joseph D Anthony
(74) *Attorney, Agent, or Firm* — Cantor Colburn LLP

(57) ABSTRACT

Disclosed herein is a flame retardant composition comprising 20 to 80 weight percent of a polycarbonate; 1 to 20 weight percent of a halogenated phenoxyphosphazene flame retardant, where all weight percents are based on a total weight of the flame retardant composition. Disclosed herein too is a method comprising blending a 20 to 80 weight percent of a polycarbonate; and 1 to 20 weight percent of a halogenated phenoxyphosphazene flame retardant to produce a flame retardant composition, where all weight percents are based on a total weight of the flame retardant composition.

17 Claims, No Drawings

(56) References Cited

U.S. PATENT DOCUMENTS

2015/0307707 A1* 10/2015 Jung .................. C08L 27/18
252/500
2016/0272812 A1* 9/2016 Zhou .................. C08K 5/5399

OTHER PUBLICATIONS

Written Opinion for International Application No. PCT/IB2016/052390, International Filing Date Apr. 27, 2016, dated Jul. 12, 2016, 4 pages.

* cited by examiner

FLAME RETARDANT COMPOSITION, METHODS OF MANUFACTURE THEREOF AND ARTICLES COMPRISING THE SAME

CROSS REFERENCE TO RELATED APPLICATIONS

This application is a National Stage application of PCT/IB2016/052390, filed Apr. 27, 2016, which claims the benefit of U.S. Provisional Application No. 62/154,851, filed Apr. 30, 2015, both of which are incorporated by reference in their entirety herein.

BACKGROUND

This disclosure relates to a flame retardant composition, methods of manufacture thereof and to articles comprising the same.

Polymers display a number of unique properties that are not commonly displayed by metals or ceramics. Amongst these properties are low densities, high toughness and impact resistance, and optical clarity. One of the drawbacks of some polymers is their lack of flame retardancy. Flame retardancy is achieved by the addition of flame retardants to polymers.

In electronic and electrical devices such as notebook personal computers, e-books, and tablet personal computers, metallic body panels are being replaced by materials that are lighter in weight and offer a robust combination of mechanical properties. These lighter materials result in weight savings, cost savings, and enable the manufacture of complex designs. While these lighter materials can be used to manufacture panels having thinner cross-sectional thicknesses, it is desirable to improve the stiffness of the material to prevent warping, while at the same time improve the impact resistance. It is also desirable to improve the flame retardancy of the material to reduce fire related hazards.

Useful flame retardants include halogen containing compounds, nitrogen containing compounds, inorganic hydroxides and phosphorus containing compounds. Halogen containing compounds such as bromine containing flame retardants are generally used in large quantities to impart the desired flame retardancy and this adversely impacts the mechanical properties.

The inorganic hydroxides are also used in very large quantities in order to impart the desired flame retardancy and this promotes a reduction in the mechanical properties. It is therefore desirable to find a flame retardant package that can be used with polymers to produce flame retardant compositions that are flame retardant but that also retain mechanical properties.

SUMMARY

Disclosed herein is a flame retardant composition comprising 20 to 80 weight percent of a polycarbonate; 1 to 20 weight percent of a halogenated phenoxyphosphazene flame retardant, where all weight percents are based on a total weight of the flame retardant composition.

Disclosed herein too is a method comprising blending a 20 to 80 weight percent of a polycarbonate; and 1 to 20 weight percent of a halogenated phenoxyphosphazene flame retardant to produce a flame retardant composition, where all weight percents are based on a total weight of the flame retardant composition.

DETAILED DESCRIPTION

Disclosed herein is a flame retardant composition that comprises an organic thermoplastic polymer and a halogenated phosphazene flame retardant additive. The flame retardant composition can be used to produce flame resistant thin walled devices where the wall thickness is 0.5 micrometers to 5 millimeters. In one embodiment, the flame retardant composition comprises a polycarbonate, a polyester and/or a polyester blend, a polysiloxane-polycarbonate copolymer and a halogenated phosphazene flame retardant compound.

In one embodiment, the flame retardant composition comprises a polycarbonate, an acrylonitrile butadiene styrene impact modifier, an optional polyester and/or a polyester blend, an optional polysiloxane-polycarbonate copolymer and a halogenated phosphazene flame retardant compound.

The flame retardant composition displays a suitable combination of stiffness and ductility as well as a low melt viscosity that renders it easily processable. The flame retardant composition can be used in electronics goods such as notebook personal computers, e-books, tablet personal computers, and the like that have thin walls. The flame retardant composition is transparent at electromagnetic frequencies in the visible wavelength region. The flame retardant composition may alternatively be optically opaque at electromagnetic frequencies in the visible wavelength region.

Organic polymers used in the flame retardant composition may be selected from a wide variety of thermoplastic polymers, blends of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer may also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination thereof.

Examples of the thermoplastic organic polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, styrene acrylonitrile, polyethylene terephthalate, polybutylene terephthalate, polyurethane, polytetrafluoroethylene, perfluoroelastomers, polyvinylidene fluoride, polysiloxanes, or the like, or a combination comprising thereof.

Exemplary organic thermoplastic polymers are polypropylene, polyethylene, ethylene based copolymer, polycarbonate, polyamide, polyester, polybutylene terephthalate, polyethylene terephthalate, polycyclohexylendimethylene terephthalate, liquid crystal polymers, polyphenylene sulfide, polyphenylene ether, polyphenylene oxide-polystyrene blends, polystyrene, high impact modified polystyrene, acrylonitrile-butadiene-styrene terpolymer, acrylic polymer, polyetherimide, polyurethane, polyetheretherketone, poly ether sulfone, or a combination thereof.

Examples of blends of organic thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic-anhydride/acrylonitrile-butadiene-styrene, polyether etherketone/polyethersulfone, polyether etherketone/polyetherimide polyethylene/nylon, polyethylene/polyacetal, or the like.

An exemplary organic polymer is a polycarbonate. "Polycarbonate" as used herein means a polymer or copolymer having repeating structural carbonate units of the formula (1)

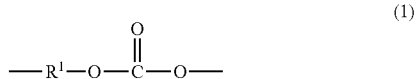

wherein at least 60 percent of the total number of $R^1$ groups are aromatic, or each $R^1$ contains at least one $C_{6-30}$ aromatic group. Polycarbonates and their methods of manufacture are known in the art, being described, for example, in WO 2013/175448 A1, US 2014/0295363, and WO 2014/072923. In a specific embodiment, the polycarbonate is a linear homopolymer containing bisphenol A carbonate units (BPA-PC); or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name CFR from the Innovative Plastics division of SABIC.

In another embodiment, the polycarbonate is a poly (carbonate-siloxane) comprising bisphenol A carbonate units and siloxane units, for example blocks containing 5 to 200 dimethylsiloxane units, such as those commercially available under the trade name EXL from the Innovative Plastics division of SABIC.

Other specific polycarbonates that can be used include poly(ester-carbonate)s comprising bisphenol A carbonate units and isophthalate-terephthalate-bisphenol A ester units, also commonly referred to as poly(carbonate-ester)s (PCE) or poly(phthalate-carbonate)s (PPC), depending on the relative ratio of carbonate units and ester units.

Other specific polycarbonates that can be used include poly(ester-carbonate-siloxane)s comprising bisphenol A carbonate units, isophthalate-terephthalate-bisphenol A ester units, and siloxane units, for example blocks containing 5 to 200 dimethylsiloxane units, such as those commercially available under the trade name FST from the Innovative Plastics division of SABIC.

Poly(aliphatic ester-carbonate)s can be used, such as those comprising bisphenol A carbonate units and sebacic acid-bisphenol A ester units, such as those commercially available under the trade name LEXAN HFD from the Innovative Plastics division of SABIC. Another specific copolycarbonate includes bisphenol A and bulky bisphenol carbonate units, i.e., derived from bisphenols containing at least 12 carbon atoms, for example 12 to 60 carbon atoms or 20 to 40 carbon atoms. Examples of such copolycarbonates include copolycarbonates comprising bisphenol A carbonate units and 2-phenyl-3,3'-bis(4-hydroxyphenyl) phthalimidine carbonate units (a BPA-PPPBP copolymer, commercially available under the trade designation XHT from the Innovative Plastics division of SABIC), a copolymer comprising bisphenol A carbonate units and 1,1-bis(4-hydroxy-3-methylphenyl)cyclohexane carbonate units (a BPA-DMBPC copolymer commercially available under the trade designation DMC from the Innovative Plastics division of SABIC), and a copolymer comprising bisphenol A carbonate units and isophorone bisphenol carbonate units (available, for example, under the trade name APEC from Bayer).

As noted above, the polycarbonate may include a linear polycarbonate, a branched polycarbonate, or a mixture of a linear and a branched polycarbonate. When the polycarbonate includes a mixture of a linear and a branched polycarbonate, the branched polycarbonate is used in amounts of 5 to 20 wt %, specifically 6 to 16 wt % and more specifically 7 to 12 wt %, based on the total weight of the flame retardant composition. Linear polycarbonates are used in amounts of 15 to 65 wt %, specifically 20 to 60 wt %, and more specifically 25 to 55 wt %, based on the total weight of the flame retardant composition.

The organic polymer, specifically the polycarbonate, is used in amounts of 20 to 80, specifically 25 to 75, specifically 30 to 70, specifically 40 to 65, specifically 45 to 60 wt %, based on the total weight of the composition.

The flame retardant composition may further comprise a polysiloxane-polycarbonate copolymer, also referred to as a polysiloxane-polycarbonate. The polydiorganosiloxane (also referred to herein as "polysiloxane") blocks of the copolymer comprise repeating diorganosiloxane units as in formula (16)

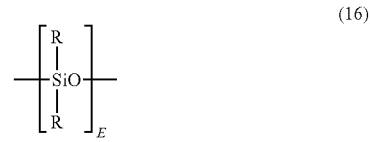

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. Combinations of the foregoing R groups can be used in the same copolymer.

The value of E in formula (16) can vary widely depending on the type and relative amount of each component in the flame retardant composition, the desired properties of the composition, and like considerations. Generally, E has an average value of 2 to 1,000, specifically 3 to 500, more specifically 5 to 100. In an embodiment, E has an average value of 10 to 75, and in still another embodiment, E has an average value of 40 to 60. Where E is of a lower value, e.g., less than 40, it can be desirable to use a relatively larger amount of the polycarbonate-polysiloxane copolymer. Conversely, where E is of a higher value, e.g., greater than 40, a relatively lower amount of the polycarbonate-polysiloxane copolymer can be used.

A combination of a first and a second (or more) polycarbonate-polysiloxane copolymers can be used, wherein the average value of E of the first copolymer is less than the average value of E of the second copolymer.

In an embodiment, the polysiloxane blocks are of formula (17)

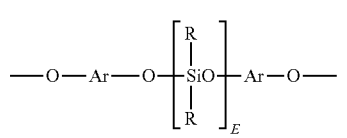

(17)

wherein E is as defined above; each R can be the same or different, and is as defined above; and Ar can be the same or different, and is a substituted or unsubstituted $C_6$-$C_{30}$ arylene group, wherein the bonds are directly connected to an aromatic moiety. Ar groups in formula (17) can be derived from a $C_6$-$C_{30}$ dihydroxyarylene compound, for example a dihydroxyarylene compound of formula (3), (4) or (6) above. Exemplary dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used.

In another embodiment, polysiloxane blocks are of formula (18)

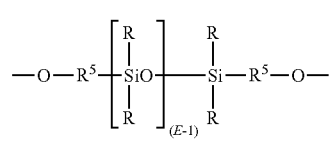

(18)

wherein R and E are as described above, and each $R^5$ is independently a divalent $C_1$-$C_{30}$ organic group, and wherein the polymerized polysiloxane unit is the reaction residue of its corresponding dihydroxy compound. In a specific embodiment, the polysiloxane blocks are of formula (19):

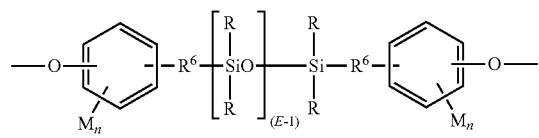

(19)

wherein R and E are as defined above. $R^6$ in formula (19) is a divalent $C_2$-$C_8$ aliphatic group. Each M in formula (22) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

Blocks of formula (20) can be derived from the corresponding dihydroxy polysiloxane (20)

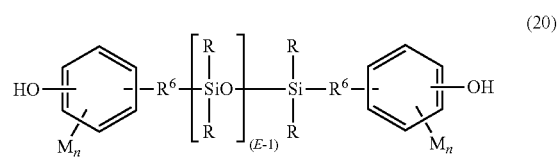

(20)

wherein R, E, M, $R^6$, and n are as described above. Such dihydroxy polysiloxanes can be made by effecting a platinum-catalyzed addition between a siloxane hydride of formula (21)

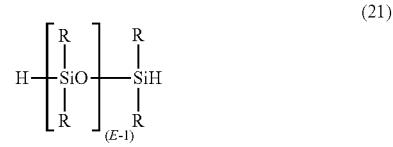

(21)

wherein R and E are as previously defined, and an aliphatically unsaturated monohydric phenol. Exemplary aliphatically unsaturated monohydric phenols include eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations comprising at least one of the foregoing can also be used.

The polysiloxane-polycarbonate copolymer can comprise 50 to 99 weight percent of carbonate units and 1 to 50 weight percent siloxane units. Within this range, the polyorganosiloxane-polycarbonate copolymer can comprise 70 to 98 weight percent, more specifically 75 to 97 weight percent of carbonate units and 2 to 30 weight percent, more specifically 3 to 25 weight percent siloxane units. In an exemplary embodiment, the polysiloxane-polycarbonate copolymer is endcapped with para-cumyl phenol.

In an embodiment, an exemplary polysiloxane-polycarbonate copolymer is a block copolymer having the structure shown in the Formula (22) below:

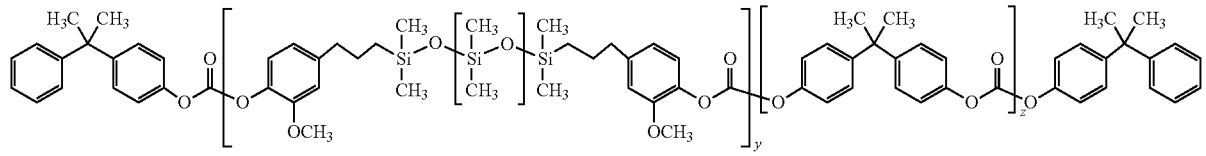

(22)

where the polysiloxane blocks are endcapped with eugenol, where x is 1 to 100, specifically 5 to 85, specifically 10 to 70, specifically 15 to 65, and more specifically 40 to 60. In an embodiment, y is 1 to 90 and z is 1 to 600. The polysiloxane block may be randomly distributed or controlled distributed amongst the polycarbonate blocks. In an embodiment, x is 30 to 50, y is 10 to 30, and z is 450 to 600.

When the polysiloxane polycarbonate copolymer comprises eugenol endcapped polysiloxane, the flame retardant composition comprises 0 to 35 wt % of the polysiloxane-polycarbonate copolymer. The polysiloxane content is 0 to 25 wt %, specifically 1 to 22 wt %, specifically 2 to 14 wt %, and more specifically 4 to 12 wt %, based on the total weight of the polysiloxane-polycarbonate copolymer. In an embodiment, the weight average molecular weight of the polysiloxane block is 29,000 to 30,000 Daltons using gel permeation chromatography with a bisphenol A polycarbonate absolute molecular weight standard.

In an embodiment, the polysiloxane-polycarbonate copolymer comprises 10 wt % or less, specifically 6 wt % or less, and more specifically 4 wt % or less, of the polysiloxane based on the total weight of the polysiloxane-polycarbonate copolymer. Polysiloxane-polycarbonate copolymers containing 10 wt % or less are generally optically transparent and are sometimes referred to as EXL-T as commercially available from Sabic.

In another embodiment, the polysiloxane-polycarbonate copolymer comprises 10 wt % or more, specifically 12 wt % or more, and more specifically 14 wt % or more, of the polysiloxane based on the total weight of the polysiloxane-polycarbonate copolymer. Polysiloxane-polycarbonate copolymers containing 10 wt % or more polysiloxane are generally optically opaque and are sometimes referred to as EXL-P as commercially available from Sabic.

The polysiloxane polycarbonate copolymer can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polysiloxane polycarbonate copolymer can have a melt volume flow rate, measured at 300° C./1.2 kg, of 1 to 50 cubic centimeters per 10 minutes (cc/10 min), specifically 2 to 30 cc/10 min. Mixtures of polysiloxane polycarbonate copolymer of different flow properties can be used to achieve the overall desired flow property.

The polysiloxane polycarbonate copolymer is present in the flame retardant composition in an amount of 3 to 30 wt %, specifically 6 to 20 wt %, and more specifically 7 to 13 wt %, based on the total weight of the flame retardant composition.

As noted above, a polyester and/or a polyester blend may also be used in the flame retardant composition. Polyesters for use in the present flame retardant compositions having repeating structural units of formula (23)

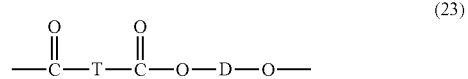

(23)

wherein each T is independently the same or different divalent $C_{6-10}$ aromatic group derived from a dicarboxylic acid or a chemical equivalent thereof, and each D is independently a divalent $C_{2-4}$ alkylene group derived from a dihydroxy compound or a chemical equivalent thereof. Copolyesters containing a combination of different T and/or D groups can be used. Chemical equivalents of diacids include the corresponding esters, alkyl esters, e.g., $C_{1-3}$ dialkyl esters, diaryl esters, anhydrides, salts, acid chlorides, acid bromides, and the like. Chemical equivalents of dihydroxy compounds include the corresponding esters, such as $C_{1-3}$ dialkyl esters, diaryl esters, and the like. The polyesters can be branched or linear.

Exemplary polyesters include poly(alkylene terephthalate) ("PAT"), poly(1,4-butylene terephthalate), ("PBT"), poly(ethylene terephthalate) ("PET"), poly(ethylene naphthalate) ("PEN"), poly(butylene naphthalate), ("PBN"), poly(propylene terephthalate) ("PPT"), poly(cyclohexane dimethanol terephthalate) ("PCT"), poly(cyclohexane-1,4-dimethylene cyclohexane-1,4-dicarboxylate) also known as poly(1,4-cyclohexanedimethanol 1,4-dicarboxylate) ("PCCD"), poly(cyclohexanedimethanol terephthalate), poly(cyclohexylenedimethylene-co-ethylene terephthalate), cyclohexanedimethanol-terephthalic acid-isophthalic acid copolymers and cyclohexanedimethanol-terephthalic acid-ethylene glycol ("PCTG" or "PETG") copolymers. When the molar proportion of cyclohexanedimethanol is higher than that of ethylene glycol the polyester is termed PCTG. When the molar proportion of ethylene glycol is higher than that of cyclohexane dimethanol the polyester is termed PETG.

The polyesters can be obtained by methods well known to those skilled in the art, including, for example, interfacial polymerization, melt-process condensation, solution phase condensation, and transesterification polymerization. Such polyester resins are typically obtained through the condensation or ester interchange polymerization of the diol or diol equivalent component with the diacid or diacid chemical equivalent component. Methods for making polyesters and the use of polyesters in thermoplastic molding compositions are known in the art. Conventional polycondensation procedures are described in the following, see, generally, U.S. Pat. Nos. 2,465,319, 5,367,011 and 5,411,999. The condensation reaction can be facilitated by the use of a catalyst, with the choice of catalyst being determined by the nature of the reactants. The various catalysts are known in the art. For example, a dialkyl ester such as dimethyl terephthalate can be transesterified with butylene glycol using acid catalysis, to generate poly(butylene terephthalate). It is possible to use a branched polyester in which a branching agent, for example, a glycol having three or more hydroxyl groups or a trifunctional or multifunctional carboxylic acid has been incorporated.

Commercial examples of PBT include those available under the trade names VALOX 315 and VALOX 195, manufactured by SABIC.

A combination of polyesters can be used, for example, a combination of virgin polyesters (polyesters derived from monomers rather than recycled polymer, including virgin poly(1,4-butylene terephthalate). Also contemplated herein are second polyesters comprising minor amounts, e.g., 0.5 to 30 wt %, of units derived from aliphatic acids and/or aliphatic polyols to form copolyesters. The aliphatic polyols include glycols, such as poly(ethylene glycol). Such polyesters can be made following the teachings of, for example, U.S. Pat. No. 2,465,319 to Whinfield et al., and U.S. Pat. No. 3,047,539 to Pengilly. Second polyesters comprising block copolyester resin components are also contemplated, and can be prepared by the transesterification of (a) straight or branched chain poly(alkylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. Especially useful when high melt strength is important are branched high melt viscosity resins, which include a small amount of, e.g., up to 5 mole percent based on the acid units of a branching component containing at least three ester forming groups. The branching component can be one that provides branching in the acid unit portion of the polyester, in the glycol unit portion, or it can be a hybrid branching agent that includes both acid and alcohol functionality. Illustrative of such branching components are tricarboxylic acids, such as trimesic acid, and lower alkyl esters thereof, and the like; tetracarboxylic acids, such as pyromellitic acid, and lower alkyl esters thereof, and the like; or preferably, polyols, and especially preferably, tetrols, such as pentaerythritol; triols, such as trimethylolpropane; dihydroxy carboxylic acids; and hydroxydicarboxylic acids and derivatives, such as dimethyl hydroxyterephthalate, and the like. Branched poly(alkylene terephthalate) resins and their preparation are described, for example, in U.S. Pat. No. 3,953,404 to Borman. In addition to terephthalic acid units, small amounts, e.g., from 0.5 to 15 mole percent of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexane dimethanol, and the like, as well as minor amounts of trifunctional, or higher, branching components, e.g., pentaerythritol, trimethyl trimesate, and the like.

In an embodiment, a PBT is used in combination with a poly(ethylene terephthalate), poly(1,4-butylene terephthalate), poly(ethylene naphthalate), poly(1,4-butylene naphthalate), poly(trimethylene terephthalate), poly(1,4-cyclohexanenedimethylene 1,4-cyclohexanedicarboxylate), poly(1,4-cyclohexanedimethylene terephthalate), poly(1,4-butylene-co-1,4-but-2-ene diol terephthalate), poly(cyclohexanedimethylene-co-ethylene terephthalate), or a combination thereof. The weight ratio of PBT to other polyester can vary from 50:50 to 99:1, specifically from 80:20 to 99:1. The polyester may be blended or copolymerized with the polycarbonate.

Any of the foregoing first and optional second polyesters can have an intrinsic viscosity of 0.4 to 2.0 deciliters per gram (dL/g), measured in a 60:40 by weight phenol/1,1,2,2-tetrachloroethane mixture at 23° C. The PBT can have a weight average molecular weight of 10,000 to 200,000 Daltons, specifically 50,000 to 150,000 Daltons as measured by gel permeation chromatography (GPC). The polyester component can also comprise a mixture of different batches of PBT prepared under different process conditions in order to achieve different intrinsic viscosities and/or weight average molecular weights. In an embodiment, a combination of polyesters having different viscosities is used, for example a combination comprising a first polyester having a viscosity from 0.5 to 1.0 dL/g and a second polyester having an intrinsic viscosity ranging from 1.1 to 1.4 dL/g. One or both of the polyesters can be a PBT. The weight ratio of the two polyesters of different viscosity can be adjusted to achieve the desired properties and is generally within the range of 20:80 to 80:20, more specifically from 40:60 to 60:40.

The amount of the polyester in the compositions can be adjusted to provide the desired properties within the limits described herein, which varies with the specific application. The flame retardant composition can accordingly comprise 10 to 60 wt %, specifically 18 to 55 wt %, and more specifically 20 to 40 wt % of the polyester, based on the total weight of the flame retardant composition. Exemplary polyesters are polybutylene terephthalate or polyethylene terephthalate. In an exemplary embodiment, the polyester is present in an amount of 10 to 30 wt %, based on the total weight of the composition.

The organic polymer is used in amounts of 20 to 80, specifically 25 to 75, specifically 30 to 70, specifically 40 to 65, specifically 45 to 60 wt %, based on the total weight of the composition.

The thermoplastic composition can further include impact modifier(s). These impact modifiers include elastomer-modified graft copolymers comprising (i) an elastomeric (i.e., rubbery) polymer substrate having a Tg less than or equal to 10° C., more specifically less than or equal to −10° C., or more specifically −40° to −80° C., and (ii) a rigid polymeric superstrate grafted to the elastomeric polymer substrate. As is known, elastomer-modified graft copolymers can be prepared by first providing the elastomeric polymer, then polymerizing the constituent monomer(s) of the rigid phase in the presence of the elastomer to obtain the graft copolymer. The grafts can be attached as graft branches or as shells to an elastomer core. The shell can merely physically encapsulate the core, or the shell can be partially or essentially completely grafted to the core.

Materials for use as the elastomer phase include, for example, conjugated diene rubbers; copolymers of a conjugated diene with less than or equal to 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Conjugated diene monomers for preparing the elastomer phase include those of formula (24)

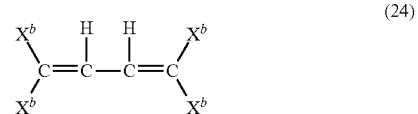

(24)

wherein each $X^b$ is independently hydrogen, $C_1$-$C_5$ alkyl, or the like. Examples of conjugated diene monomers that can be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene.

Copolymers of a conjugated diene rubber can also be used, for example those produced by aqueous radical emulsion polymerization of a conjugated diene and at least one monomer copolymerizable therewith. Monomers that are useful for copolymerization with the conjugated diene include monovinylaromatic monomers containing condensed aromatic ring structures, such as vinyl naphthalene, vinyl anthracene, and the like, or monomers of formula (25)

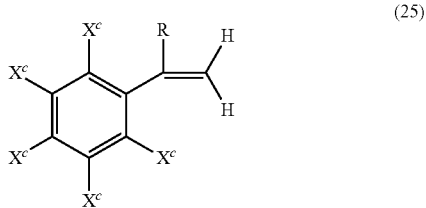

(25)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. monovinylaromatic monomers that can be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene can be used as monomers copolymerizable with the conjugated diene monomer.

Other monomers that can be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (26)

(26)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (32) include acrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Combinations of the foregoing monovinyl monomers and monovinylaromatic monomers can also be used.

(Meth)acrylate monomers for use in the elastomeric phase can be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers can optionally be polymerized in admixture with less than or equal to 15 wt % of comonomers of formulas (24), (25), or (26), based on the total monomer weight. comonomers include but are not limited to butadiene, isoprene, styrene, methyl methacrylate, phenyl methacrylate, phenethylmethacrylate, N-cyclohexylacrylamide, vinyl methyl ether or acrylonitrile, and combinations comprising at least one of the foregoing comonomers. Optionally, less than or equal to 5 wt % of a polyfunctional crosslinking comonomer can be present, based on the total monomer weight. Such polyfunctional crosslinking comonomers can include, for example, divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase can be polymerized by mass, emulsion, suspension, solution or combined processes such as bulk-suspension, emulsion-bulk, bulk-solution or other techniques, using continuous, semi-batch, or batch processes. The particle size of the elastomer substrate is not critical. For example, an average particle size of 0.001 to 25 micrometers, specifically 0.01 to 15 micrometers, or even more specifically 0.1 to 8 micrometers can be used for emulsion based polymerized rubber lattices. A particle size of 0.5 to 10 micrometers, specifically 0.6 to 1.5 micrometers can be used for bulk polymerized rubber substrates. Particle size can be measured by simple light transmission methods or capillary hydrodynamic chromatography (CHDF). The elastomer phase can be a particulate, moderately cross-linked conjugated butadiene or $C_{4-6}$ alkyl acrylate rubber, and specifically has a gel content greater than 70%. Also useful are combinations of butadiene with styrene and/or $C_{4-6}$ alkyl acrylate rubbers.

The elastomeric phase comprises 5 to 95 wt % of the total graft copolymer, more specifically 20 to 90 wt %, and even more specifically 40 to 85 wt % of the elastomer-modified graft copolymer, the remainder being the rigid graft phase.

The rigid phase of the elastomer-modified graft copolymer can be formed by graft polymerization of a combination comprising a monovinylaromatic monomer and optionally at least one comonomer in the presence of at least one elastomeric polymer substrates. The above-described monovinylaromatic monomers of formula (25) can be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Useful comonomers include, for example, the above-described monovinylic monomers and/or monomers of the general formula (24). In an embodiment, R is hydrogen or $C_1$-$C_2$ alkyl, and $X^c$ is cyano or $C_1$-$C_{12}$ alkoxycarbonyl. comonomers for use in the rigid phase include acrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase can vary widely depending on the type of elastomer substrate, type of monovinylaromatic monomer(s), type of comonomer(s), and the desired properties of the impact modifier. The rigid phase can generally comprise less than or equal to 100 wt % of monovinyl aromatic monomer, specifically 30 to 100 wt %, more specifically 50 to 90 wt % monovinylaromatic monomer, with the balance of the rigid phase being comonomer(s).

Depending on the amount of elastomer-modified polymer present, a separate matrix or continuous phase of ungrafted rigid polymer or copolymer can be simultaneously obtained along with the elastomer-modified graft copolymer. Typically, such impact modifiers comprise 40 to 95 wt % elastomer-modified graft copolymer and 5 to 65 wt % graft copolymer, based on the total weight of the impact modifier. In another embodiment, such impact modifiers comprise 50 to 85 wt %, more specifically 75 to 85 wt % rubber-modified graft copolymer, together with 15 to 50 wt %, more specifically 15 to 25 wt % graft copolymer, based on the total weight of the impact modifier.

In an embodiment, the aromatic vinyl copolymer comprises "free" styrene-acrylonitrile copolymer (SAN), i.e., styrene-acrylonitrile copolymer that is not grafted onto another polymeric chain. In a particular embodiment, the free styrene-acrylonitrile copolymer can have a molecular weight of 50,000 to 200,000 Daltons on a polystyrene standard molecular weight scale and can comprise various proportions of styrene to acrylonitrile. For example, free SAN can comprise 75 weight percent styrene and 25 weight percent acrylonitrile based on the total weight of the free SAN copolymer. Free SAN can optionally be present by virtue of the addition of a grafted rubber impact modifier in the composition that contains free SAN, and/or free SAN can by present independent of other impact modifiers in the composition.

Another specific type of elastomer-modified impact modifier comprises structural units derived from at least one silicone rubber monomer, a branched acrylate rubber monomer having the formula $H_2C=C(R^a)C(O)OCH_2CH_2R^e$, wherein $R^a$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer can comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Branched acrylate rubber monomers include iso-octyl acrylate, 6-methyloctyl acrylate, 7-methyloctyl acrylate, 6-methylheptyl acrylate, and the like, or a combination thereof. The polymerizable alkenyl-containing organic material can be, for example, a monomer of formula (25) or (26), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The first graft link monomer can be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The second graft link monomer is a polyethylenically unsaturated compound having at least one allyl group, such as allyl methacrylate, triallyl cyanurate, triallyl isocyanurate, and the like, or a combination thereof.

The silicone-acrylate impact modifiers can be prepared by emulsion polymerization, wherein, for example a silicone rubber monomer is reacted with a first graft link monomer at a temperature from 30 to 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate can be reacted with a first graft link monomer such as (gamma-methacryloxypropyl)methyldimethoxysilane. A branched acrylate rubber monomer is then polymerized with the silicone rubber particles, optionally in presence of a cross linking monomer, such as allyl methacrylate, in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid can be separated from the aqueous phase through coagulation (by treatment with a coagulant) and dried to a fine powder to produce the silicone-acrylate rubber impact modifier. This method can be generally used for producing the silicone-acrylate impact modifier having a particle size of 100 nanometers to 2 micrometers.

Processes known for the formation of the foregoing elastomer-modified graft copolymers include mass, emulsion, suspension, and solution processes, or combined processes such as bulk-suspension, emulsion-bulk, bulk-solution, or other techniques, using continuous, semi-batch, or batch processes.

In an embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and can catalyze transesterification and/or degradation of polycarbonates. Instead, ionic sulfate, sulfonate, or phosphate surfactants can be used in preparing the impact modifiers, particularly the elastomeric substrate portion of the impact modifiers. Useful surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, or a combination thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers can be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers in addition to ABS and MBS include but are not limited to acrylonitrile-styrene-butyl acrylate (ASA), methyl methacrylate-butadiene (MB), methyl methacrylate-acrylonitrilebutadiene-styrene (MABS), and acrylonitrile-ethylene-propylene-diene-styrene (AES). An exemplary impact modifier is acrylonitrile-butadiene-styrene (ABS).

Impact modifiers are generally present in amounts of 1 to 30 wt %, specifically 3 to 25 wt %, and more specifically 4 to 20 wt %, based on the total weight of the polymers in the flame retardant composition. An exemplary impact modifier comprises an acrylic polymer in an amount of 2 to 15 wt %, specifically 3 to 12 wt %, based on the total weight of the flame retardant composition.

The flame retardant is a halogenated phosphazene compound. The phosphazene compound used in the flame retardant composition is an organic compound having a —P=N— bond in the molecule. In an embodiment, the phenoxyphosphazene compound has a structure represented by the formula (27)

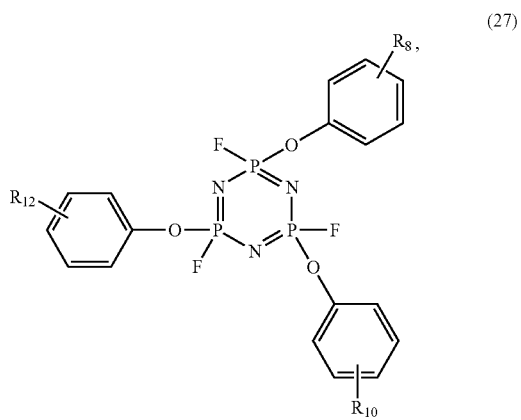

(27)

where $R_8$, $R_{10}$ and $R_{12}$ can be the same of different and can independently be a hydrogen, a halogen, an aryl group, an aralkyl group, a $C_{1-12}$ alkoxy, a $C_{1-12}$ alkyl, a $C_1$ to $C_{12}$ haloalkyl or a combination thereof.

An exemplary phenoxyphosphazene is a halogenated phenoxyphosphazene such as trifluorophenoxyphosphazene having the structure shown in (28):

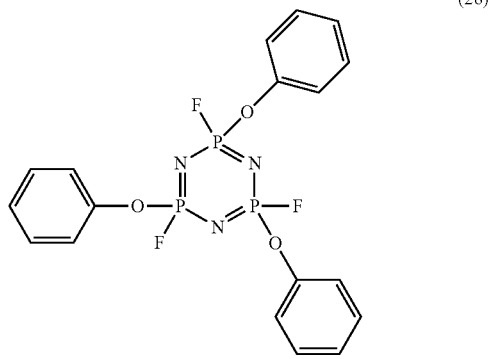

(28)

A useful commercially available trifluorophenoxyphosphazene is F-PhZ commercially available from Cenway Technology Limited under the brand name is CWFR-TFTP.

In an embodiment, the flame retardant polycarbonate composition may contain reinforcing fillers. Examples of reinforcing fillers are glass fibers, carbon fibers, metal fibers, and the like.

The glass fibers may be flat or round fibers. Flat glass fibers have an elliptical cross-sectional area, while round fibers have a circular cross-sectional area, where the cross-sectional areas are measured perpendicular to the longitudinal axis of the fiber. The glass fibers may be manufactured from "E-glass," "A-glass," "C-glass," "D-glass," "R-glass," "S-glass," as well as E-glass derivatives that are fluorine-free and/or boron-free. The glass fibers may be woven or non-woven. The glass fibers can have a diameter of 3 micrometers to 25 micrometers, specifically 4 micrometers to 20 micrometers, and more specifically 8 micrometers to 15 micrometers.

The carbon fibers may be either carbon nanotubes or carbon fibers derived from pitch or polyacrylonitrile. The carbon nanotubes can be single wall carbon nanotubes or multiwall carbon nanotubes. The carbon nanotubes can have diameters of 2.7 nanometers to 100 nanometers and can have aspect ratios of 5 to 1000. The aspect ratio is defined as the ratio of the length to the diameter.

The carbon fibers derived from pitch and polyacrylonitrile have a different microstructure from the carbon nanotubes. The carbon fibers can have a diameter of 3 micrometers to 25 micrometers, specifically 4 micrometers to 20 micrometers, and more specifically 8 micrometers to 15 micrometers and can have aspect ratios of 0.5 to 100.

The metal fibers can be whiskers (having diameters of less than 100 nanometers) or can have diameters in the micrometer regime. Metal fibers in the micrometer regime can have diameters of 3 to 30 micrometers. Exemplary metal fibers comprise stainless steel, aluminum, iron, nickel, copper, or the like, or a combination thereof.

The flame retardant polycarbonate composition comprises the reinforcing fibers in an amount of 1 to 50 wt %, specifically 10 to 40 wt %, and more specifically 20 to 30 wt %, based on the total weight of the flame retardant polycarbonate composition.

The composition may optionally contain anti-flame dripping agents include but are not limited to polymeric chain extenders that could be any multi-functional modified styrene-acrylic oligomers; or multi-functional amino or carboxyl chain extenders; or mixture of TEFLON (poly(tetrafluoroethylene)) and SAN (poly(styrene-acrylonitrile)) resin or any mixture of any of the foregoing. The anti-flame dripping agent may be present in an amount of 0 to 2, specifically 0.2 to 1.8 and more specifically 0.5 to 1.5 wt %, based on the total weight of the flame retardant composition.

Other additives such as anti-oxidants, thermal stabilizers, anti-ozonants, mold release agents, UV stabilizers, dyes, colorants, may also be used in the composition. An article may be formed from the composition disclosed herein. In an embodiment, the article is a molded article.

The preparation of the flame retardant composition can be achieved by blending the ingredients under conditions that produce an intimate blend. All of the ingredients can be added initially to the processing system, or else certain additives can be precompounded with one or more of the primary components.

In an embodiment, the composition is manufactured by blending the organic polymer with the flame retardant package. The blending can be dry blending, melt blending, solution blending, or a combination thereof.

In an embodiment, the composition can be dry blended to form a mixture in a device such as a Henschel mixer or a Waring blender prior to being fed to an extruder, where the mixture is melt blended. In another embodiment, a portion of the organic polymer can be premixed with the flame retardant package to form a dry preblend. The dry preblend is then melt blended with the remainder of the organic polymer in an extruder. In an embodiment, a portion of the composition can be fed initially at the mouth of the extruder while the remaining portion of the composition is fed through a port downstream of the mouth.

Blending of the composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Blending involving the aforementioned forces may be conducted in machines such as single or multiple screw extruders, Buss kneader, Henschel, helicones, Ross mixer, Banbury, roll mills, molding machines such as injection molding machines, vacuum forming machines, blow molding machine, or then like, or combinations comprising at least one of the foregoing machines.

The composition can be introduced into the melt blending device in the form of a masterbatch. For example, a portion of the composition can be pre-blended with the flame retardant package to form a masterbatch, which is then blended with the remaining ingredients to form the flame retardant composition. In such a process, the masterbatch may be introduced into the blending device downstream of the point where the remaining ingredients of the flame retardant composition are introduced.

In an embodiment, the flame-retardant composition disclosed herein are used to prepare molded articles such as for example, durable articles, electrical and electronic components, automotive parts, and the like. The compositions can be converted to articles using common thermoplastic processes such as film and sheet extrusion, injection molding, gas-assisted injection molding, extrusion molding, compression molding and blow molding.

In an embodiment, the flame retardant compositions when prepared into test specimens having a thickness of 0.6 to 3 mm, exhibit a flammability class rating according to Underwriters Laboratories Inc. UL-94 of at least V-2, more specifically at least V-1, and yet more specifically at least V-0.

Flammability tests were performed following the procedure of Underwriter's Laboratory Bulletin 94 entitled "Tests for Flammability of Plastic Materials, UL 94." Several ratings can be applied based on the rate of burning, time to extinguish, ability to resist dripping, and whether or not drips are burning. Samples for testing are bars having dimensions of 125 mm length×13 mm width by no greater than 13 mm thickness. Materials can be classified according to this procedure as UL 94 HB (horizontal burn), V0, V1, V2, 5VA and/or 5VB on the basis of the test results obtained for five samples; however, the compositions herein were tested and classified only as V0, V1, and V2, the criteria for each of which are described below.

V0: In a sample placed so that its long axis is 180 degrees to the flame, the period of flaming and/or smoldering after removing the igniting flame does not exceed ten (10) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 50 seconds.

V1: In a sample placed so that its long axis is 180 degrees to the flame, the period of flaming and/or smoldering after removing the igniting flame does not exceed thirty (30) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 250 seconds.

V2: In a sample placed so that its long axis is 180 degrees to the flame, the average period of flaming and/or smoldering after removing the igniting flame does not exceed thirty (30) seconds, but the vertically placed samples produce drips of burning particles that ignite cotton. Five bar flame out time is the flame out time for five bars, each lit twice, in which the sum of time to flame out for the first (t1) and second (t2) ignitions is less than or equal to a maximum flame out time (t1+t2) of 250 seconds.

In an embodiment, the flame retardant compositions are of particular utility in the manufacture flame retardant articles that pass the UL94 vertical burn tests, in particular the UL94 5VB standard. In the UL94 vertical burn test, a flame is applied to a vertically fastened test specimen placed above a cotton wool pad. To achieve a rating of 5VB, burning must stop within 60 seconds after five applications of a flame to a test bar, and there can be no drips that ignite the pad.

If a sample can pass 5VB, then the sample can continue to be tested on 5VA to get a 5VA listing. Various embodiments of the compositions described on 5VA meet the UL94 5VB standard. The test is conducted as follows:

Support the plaque specimen (150±5 mm×150±5 mm) by a clamp on the ring stand in the horizontal plane. The flame is then to be applied to the center of the bottom surface of the plaque at an angle of 20±5° from the vertical, so that the tip of the blue cone just touches the specimen. Apply the flame for 5±0.5 seconds and then remove for 5±0.5 seconds. Repeat the operation until the plaque specimen has been subjected to five applications of the test flame. When desired, to complete the test, hand hold the burner and fixture so that the tip of the inner blue cone maintains contact with the surface of the plaque. After the fifth application of the test flame, and after all flaming or glowing combustion has ceased, it is to be observed and recorded whether or not the flame penetrated (burned through) the plaque.

A VXTOOL test is used to estimate p(FTP), i.e., the probability for a first time pass when subjected to a flame. In the VXTOOL test, 20 flame bars are burnt as per UL94 test protocols and the flame data is analyzed to estimate the p(FTP) values. The p(FTP) value can range between 0 and 1 and indicates the probability that the first five bars when tested for V-0 or V-1 UL94 test would pass. A higher p(FTP) value indicates the greater likelihood of passing and therefore an improved flame retardancy. Thus, a VXTOOL p(FTP)V-0 of 1.0 signifies a very high confidence/probability of attaining the V-0 flame rating, whereas a p(FTP)V-0 of 0.0 indicates a very poor probability of attaining the V-0 flame rating.

Izod Impact Strength is used to compare the impact resistances of plastic materials. Notched Izod impact strength was determined at both 23° C. and 0° C. using a 3.2-mm thick, molded, notched Izod impact bar. It was determined per ASTM D256. The results are reported in Joules per meter. Tests were conducted at room temperature (23° C.) and at a low temperature (−20° C.).

Heat deflection temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. HDT was determined as flatwise under 1.82 MPa loading with 3.2 mm thickness bar according to ASTM D648. Results are reported in ° C.

Melt volume rate (MVR) is measured 300° C./1.2 kg as per ASTM D 1238.

The flame retardant composition displays an advantageous combination of properties such as ductility, melt processability, impact strength, and flame retardancy.

The following examples, which are meant to be exemplary, not limiting, illustrate the flame retardant compositions and methods of manufacturing of some of the various embodiments of the flame retardant compositions described herein.

The composition and methods of manufacture thereof is exemplified by the following non-limiting examples.

EXAMPLE

Example 1

This example was conducted to demonstrate the manufacturing of a flame retardant composition that comprises polycarbonate and an ABS impact modifier. The polycarbonate is blended with the ABS in an extruder. Two different phenoxyphosphazenes were separately used in the various flame retardant compositions—one for comparative compositions and the other for the disclosed compositions. The ingredients used in the Example 1 are shown in the Table 1. The suppliers of some of the ingredients are also shown in the Table 1. Table 1 lists ingredients used in the following examples along with a brief description of these ingredients. Table 2 lists the compounding conditions and Table 3 lists molding conditions.

and then extruded using a twin extruder. The composition was melt-kneaded and extruded. The extrudate was cooled through a water bath prior to pelletizing. A typical extruding condition is listed in the Table 2.

TABLE 2

| Parameters | | |
|---|---|---|
| Die | mm | 3 |
| Zone 1 Temp | ° C. | 100 |
| Zone 2 Temp | ° C. | 200 |
| Zone 3 Temp | ° C. | 255 |
| Zone 4 Temp | ° C. | 255 |
| Zone 5 Temp | ° C. | 255 |
| Zone 6 Temp | ° C. | 265 |
| Zone 7 Temp | ° C. | 265 |
| Zone 8 Temp | ° C. | 265 |
| Zone 9 Temp | ° C. | 265 |
| Die Temp | ° C. | 260 |
| Screw speed | rpm | 350 |
| Throughput | kg/hr | 60 |

After drying the obtained pellets at 100° C. for 4 hours, all the testing specimens in accordance with ASTM standards were prepared from the pellets using a 150 Ton injection molding machine at a melt temperature 250° C. and at mold temperature 80° C. Molding conditions are shown in the Table 3. The samples were tested for various properties using the standards shown in Table 4.

TABLE 3

| Parameters | | |
|---|---|---|
| Pre-drying time | Hour | 4 |
| Pre-drying temp | ° C. | 100 |
| Hopper temp | ° C. | 50 |
| Zone 1 temp | ° C. | 250 |

TABLE 1

| Acronym | Chemical Name (Use) | Trade Name, Source |
|---|---|---|
| LF PC | Polycarbonate derived from bisphenol A (37 K Mw) | SABIC Lexan ML4535 |
| MF PC | Polycarbonate derived from bisphenol A (30 K Mw) | SABIC Lexan ML5721 |
| HF PC | Polycarbonate derived from bisphenol A (22 K Mw) | SABIC Lexan ML5221 |
| EXL | Poly(bisphenol A carbonate)-polydimethylsiloxane block copolymer, having a polydimethylsiloxane content of about 20 weight percent, an average of about 45 siloxane repeat units per polysiloxane block | SABIC |
| ABS | Poly (acrylonitrile-butadiene-styrene) | SABIC |
| PBT | Poly (1,4-butylene terephthalate) with an intrinsic viscosity of 1.30 ± 0.02 deciliter per gram | 1100-211X from Chang Chun Plastics Co., Ltd. |
| PhZ | Bis(phenoxy)phosphazene oligomer | Fushimi Rabitle FP-110 |
| F-PhZ | Trifluorophenoxyphosphazene | Cenway Technology, Ltd. |
| TPPO | Triphenylphosphine oxide | Shanghai Changgen Chemical Technology Co., Ltd. |
| BPADP | BPA Diphosphate | Daihachi Co. Ltd CR741 |
| TSAN | Polytetrafluoroethylene, 50 weight percent, encapsulated in poly(styrene-co-acrylonitrile) | Sabic CYCOLACTM INP449 |
| AO1 | Tris(2,4-ditert-butylphenyl) phosphite | Ciba IRGAFOS 168 |
| AO2 | Octadecyl 3-(3,5-di-tert-butyl-4-hydroxyphenyl)propionate | Ciba IRGANOX 1076 |
| AO3 | Tetrakis(methylene(3,5di-tert-butyl-4-hydroxy-hydrocinnamate)methane | Antioxidant 1010 |
| PETS | Pentaerythritol tetrastearate | Faci Asia Pacific PTE LTD. |

Tables 2 and 3 reflect the processing conditions used to manufacture the flame retardant compositions. The compounding was conducted on a Toshiba SE37 mm twin-screw extruder having 11 barrels. The temperature for each of the barrels is detailed in the Table 2. The molding conditions are detailed in the Table 3. Typical compounding procedures are described as follows: all the ingredients were pre-blended, TABLE 3-continued

| Parameters | | |
|---|---|---|
| Zone 2 temp | ° C. | 250 |
| Zone 3 temp | ° C. | 250 |
| Nozzle temp | ° C. | 250 |

TABLE 3-continued

| Parameters | | |
|---|---|---|
| Mold temp | ° C. | 80 |
| Screw speed | rpm | 80 |
| Back pressure | kgf/cm² | 80 |
| Molding Machine | NONE | Fanuc |
| Mold Type (insert) | NONE | ASTM |

The properties along with the test and the standard used to measure a particular property are detailed in the Table 4. The compositions along with the properties are shown in the Table 5.

TABLE 4

| Property | Standard | Conditions | Specimen Type | Units |
|---|---|---|---|---|
| MFR | ASTM D1238 | Depend on system | Granule | g/10 mins |
| Notched Izod | ASTM D 256 | 0° C./23° C., 3.2 mm | Bar - 63.5 × 12.7 × 3.2 mm | J/m |
| Tensile | ASTM D 638 | Uniaxial tensile test | Tensile Type I Bar | Mpa |
| HDT | ASTM D 648 | 1.82 Mpa | Bar - 12.7 × 12.7 × 3.2 mm | ° C. |
| FR Rating | UL-VX | 0.6 mm~1.5 mm | Bar - 12.7 × 12.7 × 0.5 mm | V0, V1, V2 |

Table 5 shows polycarbonate-ABS blends with trifluorophenoxyphosphazene as the flame retardant. Sample #s 1-3 contain the trifluorophenoxyphosphazene and are the examples that demonstrate the disclosed composition, whereas Sample #s 4-6 are the comparative examples that contain either bisphenol A diphosphate (BPADP) or bisphenoxyphosphazene as flame retardants.

instead of BPADP or PhZ in the same system, a much improved FR performance can be achieved with V-0 rating in samples having thicknesses as low as 0.8~1.0 millimeter without any sacrifice in material impact strength and flow-ability (See Sample #1-3). This indicates that the trifluophenoxyphosphazene (PhZ) can lead to a better performance balance for a flame retardant PC/ABS blend.

From the Table 5 it may be seen that a composition containing polycarbonate and ABS and a fluorinated phenoxyphosphazene in amounts of approximately 5 to 10 wt % display a notched Izod impact strength of 700 to 900 joules per meter when measured at room temperature (23° C.), a flame retardancy of V-0 at a thickness of 0.8, 1.0, 1.2 and 1.5 millimeters respectively and a melt flow ratio of 10 to 25 grams per 10 minutes at a force of 2.16 kilograms and at a temperature of 260° C. This combination of properties is unique especially when compared with compositions that contain BPADP or non-fluorinated phenoxyphosphazene (PhZ).

TABLE 5

| | Sample # | | | | | |
|---|---|---|---|---|---|---|
| | 1 | 2 | 3 | 4* | 5* | 6* |
| Component | | | | | | |
| MF PC | 37.85 | 36.85 | 35.85 | 36.85 | 35.85 | 35.85 |
| HF PC | 37.84 | 36.84 | 35.84 | 36.84 | 35.84 | 35.84 |
| ABS | 17 | 17 | 17 | 17 | 17 | 17 |
| F-PhZ | 6 | 8 | 10 | | | |
| PhZ | | | | 8 | 10 | |
| BDP | | | | | | 10 |
| TSAN | 0.65 | 0.65 | 0.65 | 0.65 | 0.65 | 0.65 |
| AO1 | 0.08 | 0.08 | 0.08 | 0.08 | 0.08 | 0.08 |
| AO2 | 0.08 | 0.08 | 0.08 | 0.08 | 0.08 | 0.08 |
| PETS | 0.5 | 0.5 | 0.5 | 0.5 | 0.5 | 0.5 |
| Properties | | | | | | |
| MFR@260° C., 2.16 kg, g/10 min | 13 | 17 | 21 | 13 | 17 | 20 |
| NII@ 23° C. (J/m) | 858 | 832 | 768 | 827 | 800 | 690 |
| HDT (° C.) 1.82 MPa | 93 | 87 | 82 | 97 | 94 | 84 |
| VX-1.5 mm- UL Rating | V0 | V0 | V0 | V1 | V1 | V0 |
| VX-1.2 mm- UL Rating | V0 | V0 | V0 | N.R. | V1 | V1 |
| VX-1.0 mm- UL Rating | V1 | V0 | V0 | N.R. | N.R. | V2 |
| VX-0.8 mm- UL Rating | V2 | V2 | V0 | N.R. | N.R. | V2 |

*Comparative compositions

It can be seen from Table 5, that a typical PC/ABS composition containing a phosphate flame retardant (BPADP) (see Sample #6) displays a moderate impact strength and flame retardant performance (V-0 at 1.5 millimeter thickness) although the flow-ability is pretty high (melt index (MI)=20). Replacing the phosphate flame retardant with un-decorated phenoxyphosphazene (PhZ) improves the impact strength but will simultaneously result in flow loss and even poorer flame retardant performance (V-1 at 1.5 millimeter thickness) (See Sample #s 4 and 5). However, if trifluorophenoxyphosphazene (F-PhZ) is used Example 2

This example demonstrates the use of trifluorophenoxyphosphazene (PhZ) in a polycarbonate-polyester blend. The ingredients and the results are shown in the Table 6. The compositions were generally produced in an extruder according to the details provided in the Table 2 and were generally molded in accordance with the details provided in the Table 3. The testing of the molded samples was conducted in accordance with the details provided in the Table 6.

TABLE 6

| Component | Sample # 8 | 9* | 10* | 11* | 12 | 13* |
|---|---|---|---|---|---|---|
| LF PC | 41.05 | 41.05 | 41.05 | 41.05 | 46.45 | 46.45 |
| EXL PC | 25 | 25 | 25 | 25 | 25 | 25 |
| PBT | 25 | 25 | 25 | 25 | 20 | 20 |
| F-PhZ | 8 | | | | 8 | |
| PhZ | | 8 | | | | 8 |
| BDP | | | 8 | | | |
| TPPO | | | | 8 | | |
| TSAN | 0.4 | 0.4 | 0.4 | 0.4 | | |
| AO3 | 0.15 | 0.15 | 0.15 | 0.15 | 0.15 | 0.15 |
| MZP | 0.15 | 0.15 | 0.15 | 0.15 | 0.15 | 0.15 |
| Anti-UV | 0.25 | 0.25 | 0.25 | 0.25 | 0.25 | 0.25 |
| Properties | | | | | | |
| MFR@265° C., 5 kg, g/10 min | 21 | 16 | 22 | 28 | 20 | 16 |
| NII@ 23° C. (J/m) | 352 | 760 | 194 | 175 | 647 | 860 |
| HDT (° C.) 1.82 Mpa | 78 | 87 | 76 | 75 | 80 | 89 |
| VX-1.5 mm- UL Rating | V0 | V1 | V1 | N.R. | V0 | N.R. |
| VX-1.2 mm- UL Rating | V0 | N.R. | V2 | N.R. | V2 | N.R. |

*Comparative Examples

Table 6 shows the application of F-PhZ in a polycarbonate-polyester blend in comparison with other commonly used FR additives (BPADP, PhZ and TPPO). It can be seen that the F-PhZ renders system well balanced flow/impact/flame retardant performance for the polycarbonate-polyester blend while the comparative FR additives fail in at least one of these key properties (compare Sample #7 with Sample #s 9, 10, 11 and 13). For example, BPADP and TPPO fail in impact and flame retardancy while the non-fluorinated phenoxyphosphazene (PhZ) fails at flame retardancy and flow. Moreover, as reflected from Sample #12, even without the use of an anti-dripping agent such as TSAN, V-0 at 1.5 mm can be achieved by using F-PhZ at a relatively low PBT loading, indicating that this kind of fluorinated FR additive provides the composition with anti-dripping capabilities.

From the Table 6 it may be seen that compositions containing polycarbonate-polyester blends and trifluorophenoxyphosphazene (PhZ) display a notched Izod impact strength of 300 to 800 joules per meter when measured at room temperature (23° C.), a flame retardancy of V-0 at a thickness of any one of 0.8, 1.0, 1.2 and 1.5 millimeters and a melt flow ratio of 15 to 25 grams per 10 minutes at a force of 5.0 kilograms and at a temperature of 265° C.

Example 3

This example demonstrates the use of a polycarbonate composition with glass fibers and of trifluorophenoxyphosphazene (PhZ). The ingredients and the results are shown in the Table 7. The compositions were generally produced in an extruder according to the details provided in the Table 2 and were generally molded in accordance with the details provided in the Table 3. The testing of the molded samples was conducted in accordance with the details provided in the Table 7.

TABLE 7

| Component | Sample # 14* | 15 | 16 | 17 | 18* |
|---|---|---|---|---|---|
| MF PC | 10 | 10 | 10 | 10 | 10 |
| HF PC | 44.2 | 46.2 | 44.2 | 42.2 | 52.2 |
| EXL-PC | 8 | 8 | 8 | 8 | |
| F-PhZ | | 4 | 6 | 8 | 6 |
| PhZ | 6 | | | | |
| TSAN | 0.6 | 0.6 | 0.6 | 0.6 | 0.6 |
| AO1 | 0.1 | 0.1 | 0.1 | 0.1 | 0.1 |
| AO2 | 0.1 | 0.1 | 0.1 | 0.1 | 0.1 |
| PETS | 1 | 1 | 1 | 1 | 1 |
| GF | 30 | 30 | 30 | 30 | 30 |
| Properties | | | | | |
| MFR@300° C., 2.16 kg, g/10 min | 39 | 25 | 30 | 41 | 42 |
| Tensile Modulus (MPa) | 9357 | 9647 | 9704 | 9590 | 9799 |
| Tensile Stress (MPa) | 127 | 131 | 134 | 135 | 134 |
| NII@ 23° C. (J/m) | 125 | 115 | 126 | 136 | 103 |
| HDT (° C.) 1.82 Mpa | 113 | 114 | 107 | 98 | 106 |
| VX-1.0 mm- UL Rating | V0 | V0 | V0 | V0 | V0 |
| VX-0.8 mm- UL Rating | V1 | V0 | V0 | V0 | V0 |
| VX-0.6 mm- UL Rating | N.R. | V0 | V0 | V0 | V1 |

*Comparative Examples

Table 7 shows that compositions that contain polycarbonate, polysiloxane-polycarbonate copolymer, glass fibers and the halogenated phenoxyphosphazene flame retardant display a V-0 rating at thicknesses of 0.6, 0.8 and 1 millimeter respectively when tested as per a UL-94 protocol (See Sample #s 15, 16 and 17). Identical compositions that contain the non-halogenated phenoxyphosphazene can only achieve a V-0 rating at a 1 mm thickness (See Sample #14). From the Table 7 it can also be seen that because the halogenated phenoxyphosphazene is so effective as a flame retardant, the amount of it in the composition can be reduced to 4 wt % based on the total weight of the composition (See Sample #15).

Sample #18 does not contain any polysiloxane-polycarbonate copolymer and it can be seen that the flame retardant properties are reduced as compared with the compositions of Sample #s 15, 16 and 17, which contain the polysiloxane-polycarbonate copolymer. From the Table 7 it can be seen that compositions containing polycarbonate, polysiloxane-polycarbonate copolymer, glass fibers and the halogenated phenoxyphosphazene flame retardant display a V-0 rating at thicknesses of 0.6, 0.8 and 1 millimeter respectively, a melt flow ratio of 25 to 45 g/10 minutes when measured at 300° C. at a force of 2.16 kilograms and a notched Izod impact strength of 110 to 140 Joules per meter when measured at room temperature (23° C.).

In summary, a flame retardant composition comprises 20 to 80 weight percent of a polycarbonate and 1 to 20 weight percent of a halogenated phenoxyphosphazene flame retardant, where all weight percentages are based on a total weight of the flame retardant composition. The halogenated phenoxyphosphazene is a fluorinated phenoxyphosphazene.

In an embodiment, the flame retardant composition displays a notched Izod impact strength of 700 to 900 joules per meter when measured at a temperature of 23° C., a flame retardancy of V-0 at a thickness of 0.8 millimeters when measured as per a UL-94 protocol and a melt flow ratio of 10 to 25 grams per 10 minutes at a force of 2.16 kilograms and at a temperature of 260° C.

In another embodiment, the flame retardant composition displays a notched Izod impact strength of 300 to 800 joules per meter when measured at a temperature of 23° C., a flame retardancy of V-0 at a thickness of 0.8 millimeters when measured as per a UL-94 protocol and a melt flow ratio of 15 to 25 grams per 10 minutes at a force of 5.0 kilograms and at a temperature of 265° C.

In yet another embodiment, the flame retardant composition displays display a V-0 rating at thicknesses of 0.6 millimeter when measured as per a UL-94 protocol, a melt flow ratio of 25 to 45 g/10 minutes when measured at 300° C. at a force of 2.16 kilograms and a notched Izod impact strength of 110 to 140 Joules per meter when measured at room temperature (23° C.).

The flame retardant composition further comprises 1 to 30 wt % of an impact modifier, where the impact modifier is methyl methacrylate-butadiene-styrene, acrylonitrile-styrene-butyl acrylate, methyl methacrylate-butadiene, methyl methacrylate-acrylonitrile-butadiene-styrene, acrylonitrile-ethylene-propylene-diene-styrene, acrylonitrile-butadiene-styrene, or a combination thereof.

The flame retardant composition may further comprise a polyester; where the polyester is blended with the polycarbonate or copolymerized with the polycarbonate and where the polyester is present in an amount of 10 to 60 wt %, based on the total weight of the flame retardant composition. The polyester is poly(ethylene terephthalate), poly(1,4-butylene terephthalate), poly(propylene terephthalate), poly(alkylene naphthoates), poly(ethylene naphthanoate), poly(butylene naphthanoate), poly(cyclohexanedimethylene terephthalate), poly(cyclohexanedimethylene terephthalate)-co-poly(ethylene terephthalate), poly(1,4-cyclohexanedimethylene terephthalate), poly(alkylene cyclohexanedicarboxylate)s, poly(1,4-cyclohexane-dimethanol-1,4-cyclohexanedicarboxylate), or a combination thereof.

The flame retardant composition may further comprise a polysiloxane-polycarbonate copolymer; where the polysiloxane-polycarbonate copolymer comprises 15 to 25 weight percent polysiloxane, based on the total weight of the polysiloxane-polycarbonate copolymer.

The flame retardant composition further comprises a fibrous filler, where the fibrous filler comprises glass fibers in an amount of 1 to 50 wt %, based on the total weight of the composition.

In an embodiment, an article may be manufactured from one or more of the foregoing compositions.

Disclosed herein too is a method of manufacturing a flame retardant composition comprising blending a 20 to 80 weight percent of a polycarbonate and 1 to 20 weight percent of a halogenated phenoxyphosphazene flame retardant to produce a flame retardant composition, where all weight percents are based on a total weight of the flame retardant composition. The method further comprises blending an impact modifier with the flame retardant composition.

In another embodiment, the method further comprises blending a polyester with the flame retardant composition. In yet another embodiment, the method further comprises blending a fibrous filler with the flame retardant composition. The flame retardant composition is then subjected to molding to form a desired article.

It is to be noted that all ranges detailed herein include the endpoints. Numerical values from different ranges are combinable.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A flame retardant composition comprising:
   20 to 80 weight percent of a polycarbonate; and
   1 to 20 weight percent of a halogenated phenoxyphosphazene flame retardant, where all weight percentages are based on a total weight of the flame retardant composition; wherein the halogenated phenoxyphosphazine flame retardant has the structure represented by the formula (27)

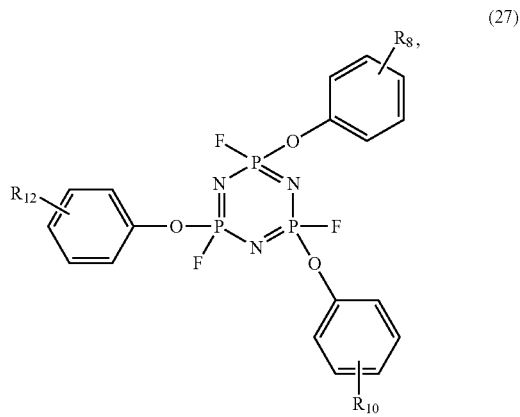

where $R_8$, $R_{10}$ and $R_{12}$ can be the same of different and can independently be a hydrogen, a halogen, an aryl group, an aralkyl group, a $C_{1-12}$ alkoxy, a $C_{1-12}$ alkyl, a $C_1$ to $C_{12}$ haloaklyl or a combination thereof.

2. The flame retardant composition of claim 1, further comprising 1 to 30 wt % of an impact modifier.

3. The flame retardant composition of claim 2, where the impact modifier is methyl methacrylate-butadiene-styrene, acrylonitrile-styrene-butyl acrylate, methyl methacrylate-butadiene, methyl methacrylate-acrylonitrile-butadiene-styrene, acrylonitrile-ethylene-propylene-diene-styrene, acrylonitrile-butadiene-styrene, or a combination thereof.

4. The flame retardant composition of claim 1, further comprising a polyester; where the polyester is blended with the polycarbonate or copolymerized with the polycarbonate and where the polyester is present in an amount of 10 to 60 wt %, based on the total weight of the flame retardant composition.

5. The flame retardant composition of claim 4, where the polyester is poly(ethylene terephthalate), poly(1,4-butylene terephthalate), poly(propylene terephthalate), poly(alkylene naphthoates), poly(ethylene naphthanoate), poly(butylene naphthanoate), poly(cyclohexanedimethylene terephthalate), poly(cyclohexanedimethylene terephthalate)-co-poly(ethylene terephthalate), poly(1,4-cyclohexanedimethylene terephthalate), poly(alkylene cyclohexanedicarboxylate)s, poly(1,4-cyclohexane-dimethanol-1,4-cyclohexanedicarboxylate), or a combination thereof.

6. The flame retardant composition of claim 1, further comprising a polysiloxane-polycarbonate copolymer; where the polysiloxane-polycarbonate copolymer comprises 15 to 25 weight percent polysiloxane, based on the total weight of the polysiloxane-polycarbonate copolymer.

7. The flame retardant composition of claim 1, further comprising a fibrous filler.

8. The flame retardant composition of claim 7, where the fibrous filler comprises glass fibers in an amount of 1 to 50 wt %, based on the total weight of the composition.

9. The flame retardant composition of claim 1, where the halogenated phenoxyphosphazene is a fluorinated phenoxyphosphazene and where the flame retardant composition displays a notched Izod impact strength of 700 to 900 joules per meter when measured at a temperature of 23° C., a flame retardancy of V-0 at a thickness of 0.8 millimeters when measured as per a UL-94 protocol and a melt flow ratio of 10 to 25 grams per 10 minutes at a force of 2.16 kilograms and at a temperature of 260° C.

10. The flame retardant composition of claim 1, where the flame retardant composition displays a notched Izod impact strength of 300 to 800 joules per meter when measured at a temperature of 23° C., a flame retardancy of V-0 at a thickness of 0.8 millimeters when measured as per a UL-94 protocol and a melt flow ratio of 15 to 25 grams per 10 minutes at a force of 5.0 kilograms and at a temperature of 265° C.

11. The flame retardant composition of claim 1, where the flame retardant composition displays display a V-0 rating at thicknesses of 0.6 millimeter when measured as per a UL-94 protocol, a melt flow ratio of 25 to 45 g/10 minutes when measured at 300° C. at a force of 2.16 kilograms and a notched Izod impact strength of 110 to 140 Joules per meter when measured at room temperature.

12. An article manufactured from the composition of claim 1.

13. A method comprising:
blending a 20 to 80 weight percent of a polycarbonate; and 1 to 20 weight percent of a halogenated phenoxyphosphazene flame retardant to produce a flame retardant composition, where all weight percents are based on a total weight of the flame retardant composition; wherein the halogenated phenoxyphosphazine flame retardant has the structure represented by the formula (27)

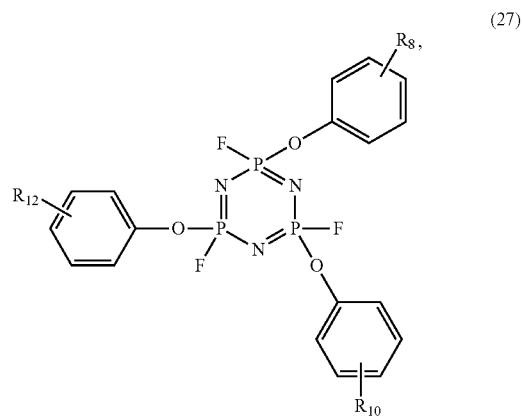

(27)

where $R_8$, $R_{10}$ and $R_{12}$ can be the same of different and can independently be a hydrogen, a halogen, an aryl group, an aralkyl group, a $C_{1-12}$ alkoxy, a $C_{1-12}$ alkyl, a $C_1$ to $C_{12}$ haloaklyl or a combination thereof.

14. The method of claim 13, further comprising blending an impact modifier with the flame retardant composition.

15. The method of claim 13, further comprising blending a polyester with the flame retardant composition.

16. The method of claim 13, further comprising blending a fibrous filler with the flame retardant composition.

17. The method of claim 13, further comprising molding the composition.

* * * * *